United States Patent
Bier

(10) Patent No.: US 9,058,588 B2
(45) Date of Patent: Jun. 16, 2015

(54) COMPUTER-IMPLEMENTED SYSTEM AND METHOD FOR MANAGING A CONTEXT-SENSITIVE SIDEBAR WINDOW

(71) Applicant: Palo Alto Research Center Incorporated, Palo Alto, CA (US)

(72) Inventor: Eric A. Bier, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 224 days.

(21) Appl. No.: 13/673,925

(22) Filed: Nov. 9, 2012

(65) Prior Publication Data
US 2013/0067384 A1    Mar. 14, 2013

Related U.S. Application Data

(63) Continuation of application No. 12/570,733, filed on Sep. 30, 2009, now Pat. No. 8,312,385.

(51) Int. Cl.
*G06F 3/048* (2013.01)
*G06Q 10/10* (2012.01)
*G06F 9/44* (2006.01)
*G06F 3/00* (2006.01)

(52) U.S. Cl.
CPC .............. *G06Q 10/10* (2013.01); *G06F 9/4443* (2013.01); *G06F 3/048* (2013.01)

(58) Field of Classification Search
None
See application file for complete search history.

(56) References Cited

U.S. PATENT DOCUMENTS

| | | | | |
|---|---|---|---|---|
| 5,757,371 | A * | 5/1998 | Oran et al. | 715/779 |
| 5,859,639 | A * | 1/1999 | Ebrahim | 715/788 |
| 6,297,819 | B1 | 10/2001 | Furst | |
| 7,228,492 | B1 | 6/2007 | Graham | |
| 7,343,567 | B2 | 3/2008 | Mann et al. | |
| 7,657,842 | B2 * | 2/2010 | Matthews et al. | 715/788 |
| 8,255,824 | B2 * | 8/2012 | Selig | 715/781 |
| 2002/0186257 | A1 | 12/2002 | Cadiz et al. | |
| 2004/0186817 | A1 | 9/2004 | Thames et al. | |
| 2005/0055645 | A1 * | 3/2005 | Matthews et al. | 715/800 |
| 2005/0060664 | A1 * | 3/2005 | Rogers | 715/810 |
| 2006/0095865 | A1 * | 5/2006 | Rostom | 715/810 |
| 2006/0112339 | A1 | 5/2006 | Struthers et al. | |

(Continued)

FOREIGN PATENT DOCUMENTS

| | | |
|---|---|---|
| EP | 0514307 A2 * | 11/1992 |
| EP | 2642479 A2 * | 9/2013 |

(Continued)

OTHER PUBLICATIONS

Vista Sidebar Style to DO List, Jun. 18, 2007, 5 pages.*

(Continued)

*Primary Examiner* — Yongjia Pan
(74) *Attorney, Agent, or Firm* — Patrick J.S. Inouye; Krista A. Wittman

(57) ABSTRACT

A computer-implemented system and method for managing a context-sensitive sidebar window is provided. Contextual information relevant to an electronic document is determined. A portion of the determined contextual information is presented in a sidebar window. A display of the context-sensitive sidebar window is managed by automatically opening the context-sensitive sidebar window when the electronic document is opened and automatically closing the context-sensitive sidebar window when the document is closed.

20 Claims, 14 Drawing Sheets

(56) References Cited

U.S. PATENT DOCUMENTS

| | | |
|---|---|---|
| 2007/0044029 A1 | 2/2007 | Fisher et al. |
| 2007/0094597 A1* | 4/2007 | Rostom .................. 715/700 |
| 2007/0157107 A1 | 7/2007 | Bishop |
| 2007/0180401 A1* | 8/2007 | Singh et al. .................. 715/794 |
| 2007/0226204 A1 | 9/2007 | Feldman |
| 2008/0027707 A1* | 1/2008 | Stefik et al. .................. 704/9 |
| 2008/0120569 A1 | 5/2008 | Mann et al. |
| 2008/0184159 A1 | 7/2008 | Selig |
| 2008/0270591 A1 | 10/2008 | Whittle et al. |
| 2008/0295019 A1* | 11/2008 | Han et al. .................. 715/781 |
| 2009/0204915 A1* | 8/2009 | Yamagami et al. .......... 715/764 |
| 2010/0082695 A1* | 4/2010 | Hardt .................. 707/798 |
| 2010/0095298 A1 | 4/2010 | Seshadrinathan et al. |
| 2010/0169765 A1 | 7/2010 | Cui et al. |
| 2012/0260195 A1* | 10/2012 | Hon et al. .................. 715/753 |

FOREIGN PATENT DOCUMENTS

| | | |
|---|---|---|
| WO | WO0057281 * | 9/2000 |
| WO | WO2006115718 A2 * | 11/2006 |

OTHER PUBLICATIONS

Opacity in Sidebar Gadget, Jan. 9, 2007, 4 pages.*
Special Edition Using Microsoft Windows Vista, May 5, 2008, 3 pages.*
Adam Pash, Reserve Space from Maximized Windows with DesktopCoral, Nov. 6, 2007, 1 page.*

* cited by examiner

COMPUTER-IMPLEMENTED SYSTEM AND METHOD FOR MANAGING A CONTEXT-SENSITIVE SIDEBAR WINDOW

CROSS-REFERENCE TO RELATED APPLICATION

This patent application is a continuation of U.S. patent application, Ser. No. 12/570,733 filed Sep. 30, 2009, pending, the priority filing date of which is claimed, and the disclosure of which is incorporated by reference.

FIELD

This application relates in general to application contextual information provisioning and, in particular, to a system and method for providing context-sensitive sidebar window display on an electronic desktop.

BACKGROUND

Business relationships and communications are driven by productivity software used in the creation of documents and other written exchanges between organizations and individuals. Commonly, productivity software, such as word processing, spreadsheet, email, presentation, and Web browsing applications, are installed on personal computers and similar programmable devices.

Each personal computer or computing device provides a computing system environment within which content can be presented, manipulated, and modified. Provisions for accessing the content and controlling an application are provided through a graphical user interface using a single or combination of application windows, within which text can be entered through a keyboard and the application controlled through the keyboard or by a pointing device, such as a mouse, track pad, or trackball. Other user input and control devices are possible.

Application-specific controls are generally provided as an integral part of the screen interface and are presented along the top, bottom, or side margins of a main application window through buttons, toggles, scroll boxes, pull-down menus, and other user controls, which manage program options, user selections, and environmental information. Extended information is often provided through visually-separate windows, such as pop-up dialog or adjacently-appearing sidebar windows, through which help, tutorial, file system navigation, file property, and other supplemental information is presented.

In particular, sidebar-style windows can provide valuable context about documents currently in use. Ideally, the value of the information provided inside a sidebar should offset the cost of the distraction in terms of screen space and time spent glancing over to the sidebar from the main application window. If poorly styled, a sidebar can be distracting to a user. For example, the physical distance of a sidebar from the primary material in use can be critical due to the limited screen space available to an application. Placing a sidebar too distant from the primary material may require both considerable eye travel and significant pointer device travel, which reduces the information's value and the usefulness of interacting with the sidebar. As well, the material relevance of information in a sidebar is frequently removed from the immediate state of the current task and often not sufficiently related to the immediate task at hand to warrant causing user distraction. Finally, visual "bouncing" can occur when a user moves between several active application windows and a sidebar may appear to rapidly reposition itself as the window focus changes, thus creating visual distraction. Due to such concerns, a sidebar may be disabled, yet the value of the sidebar is lost when turned off, thereby rendering potentially useful tangential information, such as document versions available, document authorship, related documents available in the same folder or Website or on the same topic, annotations available, what other users are saying about the document, and other information unavailable.

Accordingly, what is needed is an approach to providing a sidebar window that operates within the close context of a document provided in a primary application window within behaviors adapted to minimize user distraction.

SUMMARY

One embodiment provides a computer-implemented system and method for providing context-sensitive sidebar window display on an electronic desktop. A document that includes digital data is maintained in electronic storage. The document is operated upon through an application window generated by an application program on an electronic desktop on an electronic desktop. A sidebar window is initially generated. Contextual information relevant to the document is determined. Part of the contextual information to present is selected based on a current state of the document in the application window. The selected part of the contextual information is presented in the sidebar window positioned visually adjacent to the application window. The contextual information presented in and the positioning of the sidebar window is continually updated in step with the current state of the document and the application window.

A further embodiment provides a computer-implemented system and method for managing a context-sensitive sidebar window. Contextual information relevant to an electronic document is determined. A portion of the determined contextual information is presented in a sidebar window. A display of the context-sensitive sidebar window is managed by automatically opening the context-sensitive sidebar window when the electronic document is opened and automatically closing the context-sensitive sidebar window when the document is closed.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

DETAILED DESCRIPTION

Enterprise Environment

Figure 1:
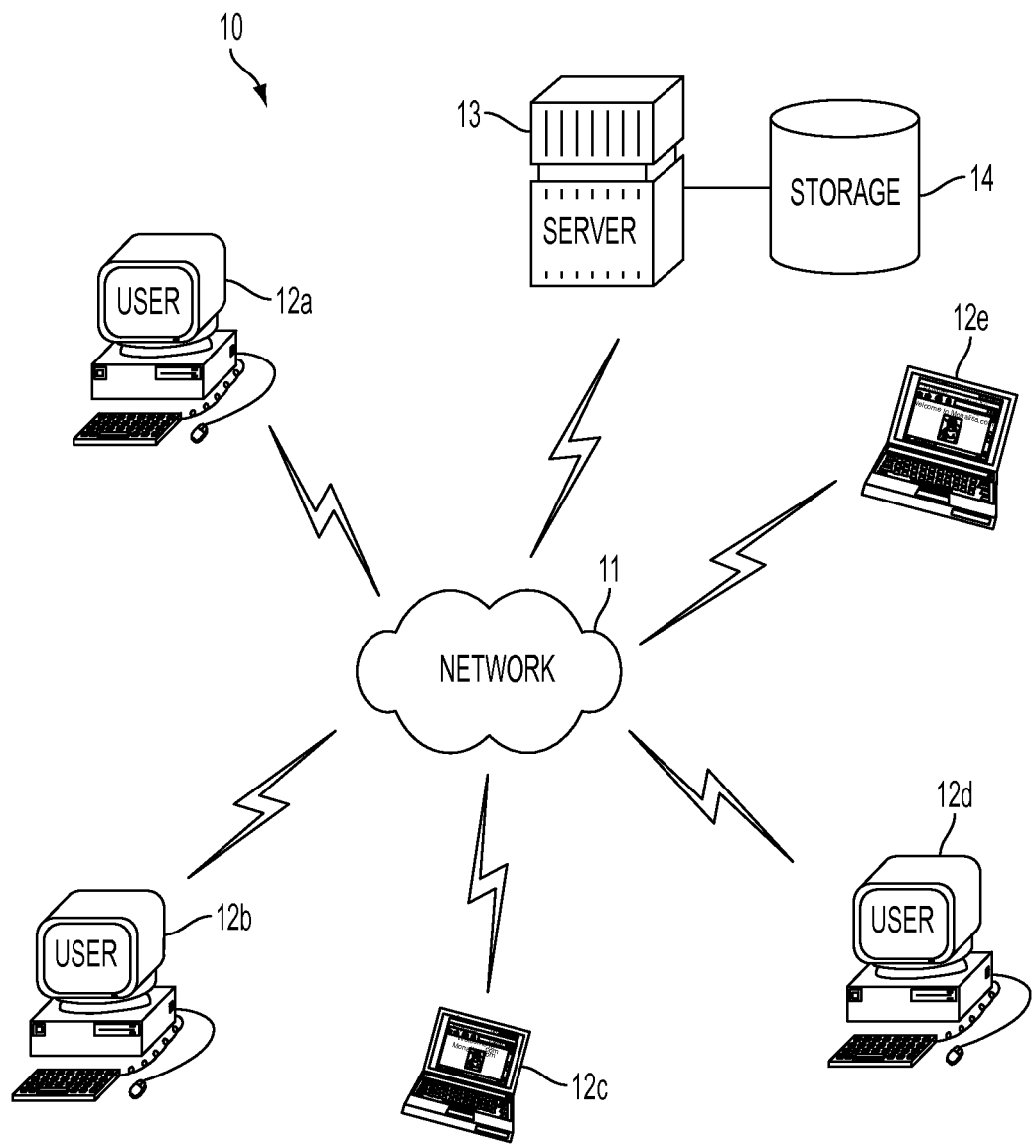
FIG. 1 is a block diagram showing an enterprise environment for providing context-sensitive sidebar window display on an electronic desktop in accordance with one embodiment.

In an enterprise computing environment, users collaborate around many kinds of documents, including emails, web pages, office documents, spreadsheets, and presentations. Their activities around documents include creating, reading, revising, mailing in attachments, placing in shared repositories, adding comments, tagging, annotating, printing, and other types of activities. FIG. 1 is a block diagram showing an enterprise environment 10 for providing a context-sensitive sidebar window display on an electronic desktop in accordance with one embodiment. The environment 10 includes a set of users that execute word processing, spreadsheet, email, presentation, Web browsing, and other productivity applications on personal computers and other similar programmable computing systems or devices 12a-e. On each computing system, the applications are on an electronic desktop under the control of a windowed operating environment, such as the Windows operating system, licensed by Microsoft Corporation, Redmond, Wash., and the OS X operating system, licensed by Apple Inc., Cupertino, Calif. The windowed operating environment provides a graphical user interface that presents content within one or more application windows on the electronic desktop.

The computing systems are interconnected over a network 11, which provides access to each of the other computing systems and to diverse and distributed information resources. Information may also be made available through a centrally-located enterprise server 13, similarly interconnected over the network 11, or from other devices situated within or external to the immediate enterprise environment. In particular, the enterprise server 13 is operatively coupled to a storage device 14 in which information can be maintained for use by the computing systems 12a-e and other devices. Both the client computing devices 12a-e and the enterprise server 13 include components conventionally found in general purpose programmable computing devices, such as a central processing unit, memory, input/output ports, network interfaces, and non-volatile storage. Other components are possible.

Context Extraction

Figure 2:
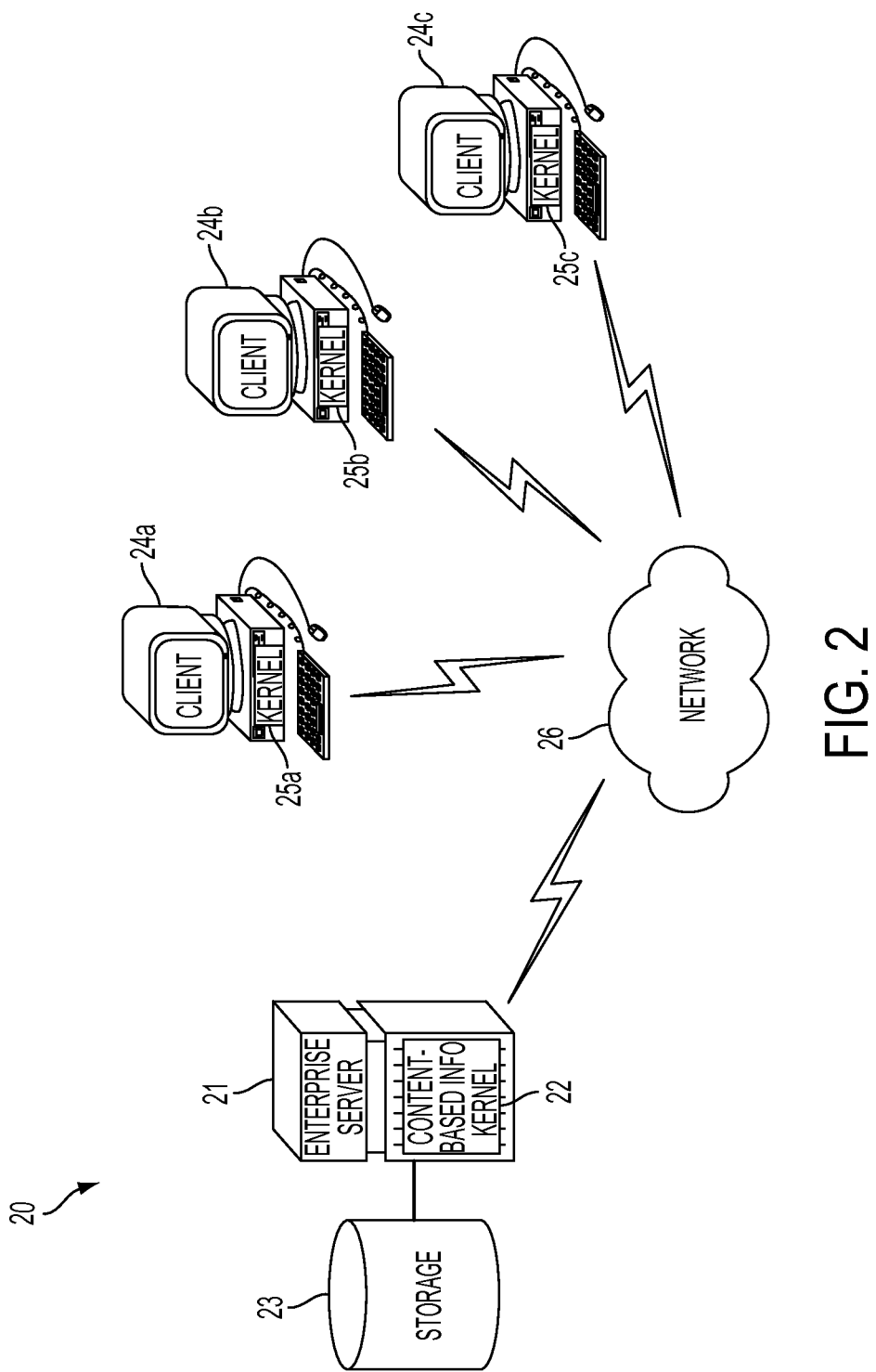
FIG. 2 is a functional block diagram showing kernel functionality provided with an enterprise server and client computing systems, such as provided in the enterprise environment 10 of FIG. 1.

The context of a document can be extracted by both analyzing the content of a document and by analyzing the way that document is used by people, that is, how the document is created, read, revised, mailed, stored, augmented with comments, tagged, annotated, printed, and so forth. FIG. 2 is a functional block diagram showing kernel functionality 20 provided with an enterprise server 21 and client computing systems 24a-c, such as provided in the enterprise environment 10 of FIG. 1. The enterprise server 21 is coupled to a storage device 23 and interconnected with one or more client computing devices 24a-c via a network infrastructure 26. Comparable context extraction functionality is respectively provided on both the enterprise server 21 and each of the client computing systems 24a-c through content-based information kernels 22 and 25a-c. Architecturally, the kernels 22 and 25a-c are the same, which enables the same type of context to be extracted independent of the platform type or location.

Architecture

Figure 3:
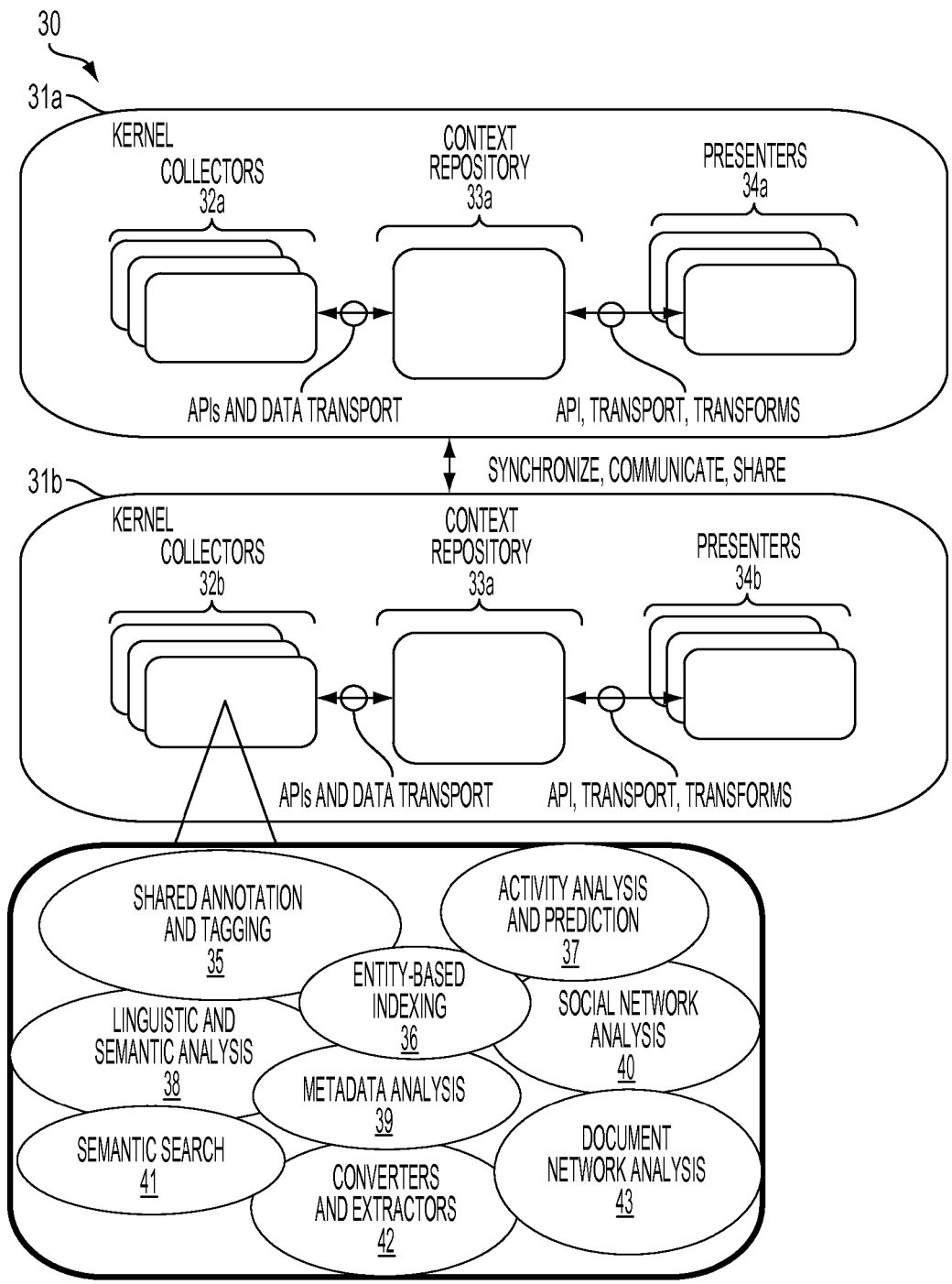
FIG. 3 is a block diagram showing the overall architecture of the enterprise environment of FIG. 1.

The kernels are part of a set of components, which extract context that is propagated and used throughout the enterprise environment 10. FIG. 3 is a block diagram showing the overall architecture 30 of the enterprise environment 10 of FIG. 1. Kernels 31a-b can be replicated on multiple computer systems and can synchronize, communicate, and share context with each other, as a form of federation. The collectors 32a-b collect context about documents, emails, activities, tasks, annotations, links, people, organizations, and other data of potential interest within the enterprise environment 10. The collectors 32a-b are context analysis engines, which collect and evaluate the context to discern, for instance, which documents refer to which other documents, which documents include which other documents (as is common with email attachments), what tags or annotations people have applied to which documents, what documents might be of interest to people in a particular work group, what the documents are saying on some topic, how to best categorize the documents identified, what people are doing in terms of their activities vis-à-vis the documents, and other determinations.

Each of the collectors 32a-b is respectively connected to a context repository 33a-b through an application programming interface (API), which provides a data transport channel. The collected context is fed via the API into each context repository 33a-b for use by computing systems, enterprise servers, and other devices permitted to collaboratively use, modify, and share the context. Each context repository 33a-b includes both a database for storing formatted data, and storage for maintaining unstructured documents and other data. In turn, each context repository 33a-b may optionally be federated with one or more other repositories to allow some or all of the context to be shared between the repositories.

Each of the context repositories 33a-b is also respectively connected to a set of presenters 34a-b through a second API, which provides a data transport channel and data transformation and conversion. The context maintained by each context repository 33a-b is provided via the API to one or more presenters 34a-b, which provide the context to users via user interface mechanisms, including a context-sensitive sidebar, as further described below beginning with reference to FIG. 4. The context-sensitive sidebar enables users to manipulate the context, as well as perform other discrete or collaborative operations, such as annotating a document, sending an email reminder, or linking a Web page.

The context is generated by each of the set of collectors 32a-b. Each collector 32a-b includes functional modules for performing shared annotation and tagging 35, entity-based indexing 36, activity analysis and prediction 37, linguistic and semantic analysis 38, metadata analysis 39, social network analysis 40, semantic search 41, converters and extractors 42, and document network analysis 43. Converters convert documents into other formats, including plain text and a sequence of images. Extractors then extract metadata from one or more projections, as when entities are found in the plain text that has been extracted from a document. Other functional modules are possible.

Context Network

Figure 4:
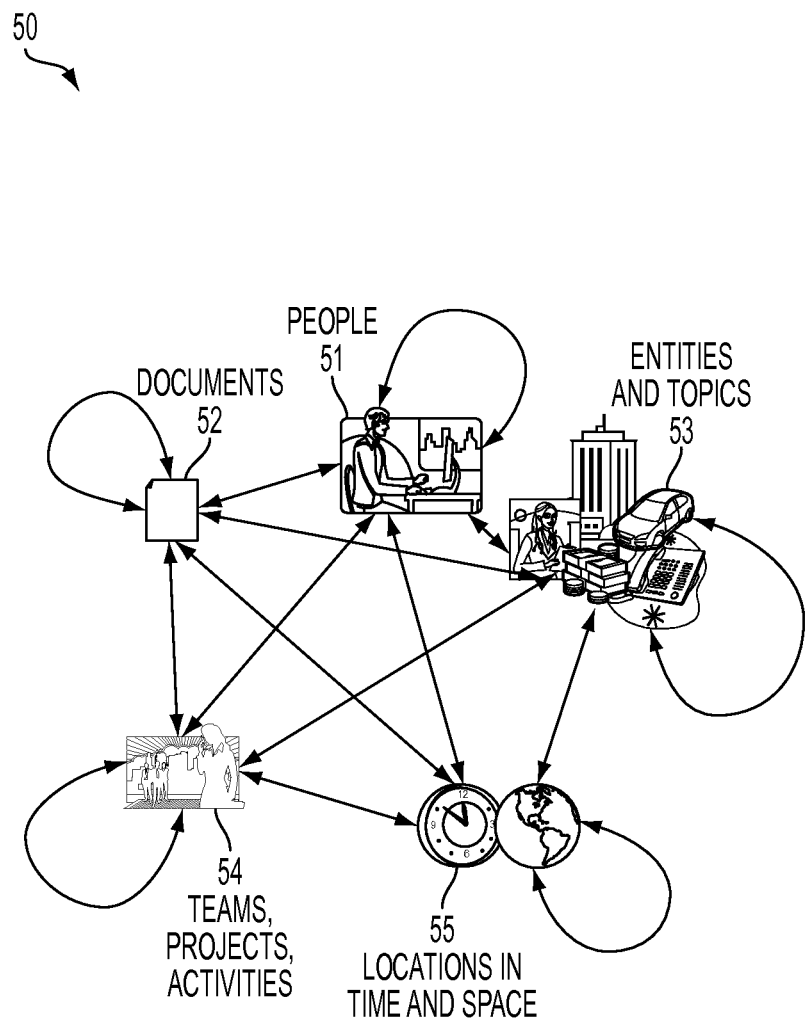
FIG. 4 is a block diagram showing a schema for context networks as provided through the enterprise environment of FIG. 1.

Context information is provided to users through the presenters 34*a-b*. FIG. 4 is a block diagram showing a schema for context network 50 as provided through the enterprise environment 10 of FIG. 1. A context network 50 can be created to represent the linkages between specific documents, people, topics, human activities, and time and space locations. More specifically, the context network 50 can be formed by analyzing the content of the documents 52 and of human activities around the documents. The people-oriented elements of the context analysis engine in each collector 32*a-b*, for instance, the shared annotation and tagging 35, activity analysis and prediction 37, and social network analysis 40 functional modules, facilitate linking people 51; documents 52; entities and topics 53; teams, projects, and activities 54; and locations in time and space 55 into a context network 50, and the resulting context network 50 is stored in a context repository 33*a-b*.

Figure 5:
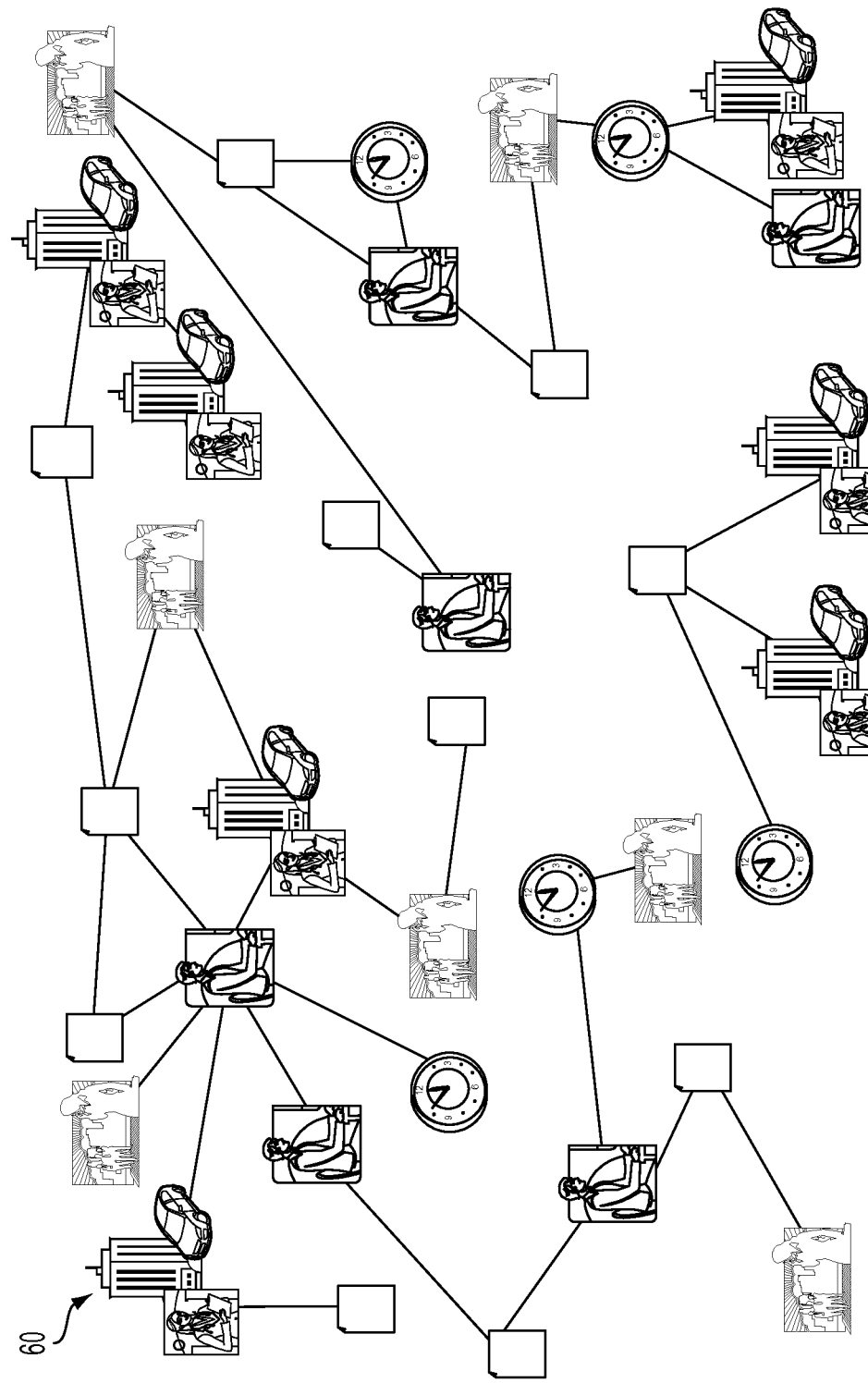
FIG. 5 is a block diagram showing, by way of example, a graph of a context network.

The stored context networks 50 serve as a chief source of context for the presenters 34*a-b*. FIG. 5 is a block diagram showing, by way of example, a graph of a context network 60. The edges of the graph indicate relationships that have been discovered between specific documents, people, activities, topics, times, locations, and the like. As a result, a broader perspective is captured and stored, which can be instrumental in creating sidebars that are sensitive to the context applicable to a specific document and more useful to a user than a conventional document-neutral, application-specific control.

Human Activity Contributions to Context

Figure 6:
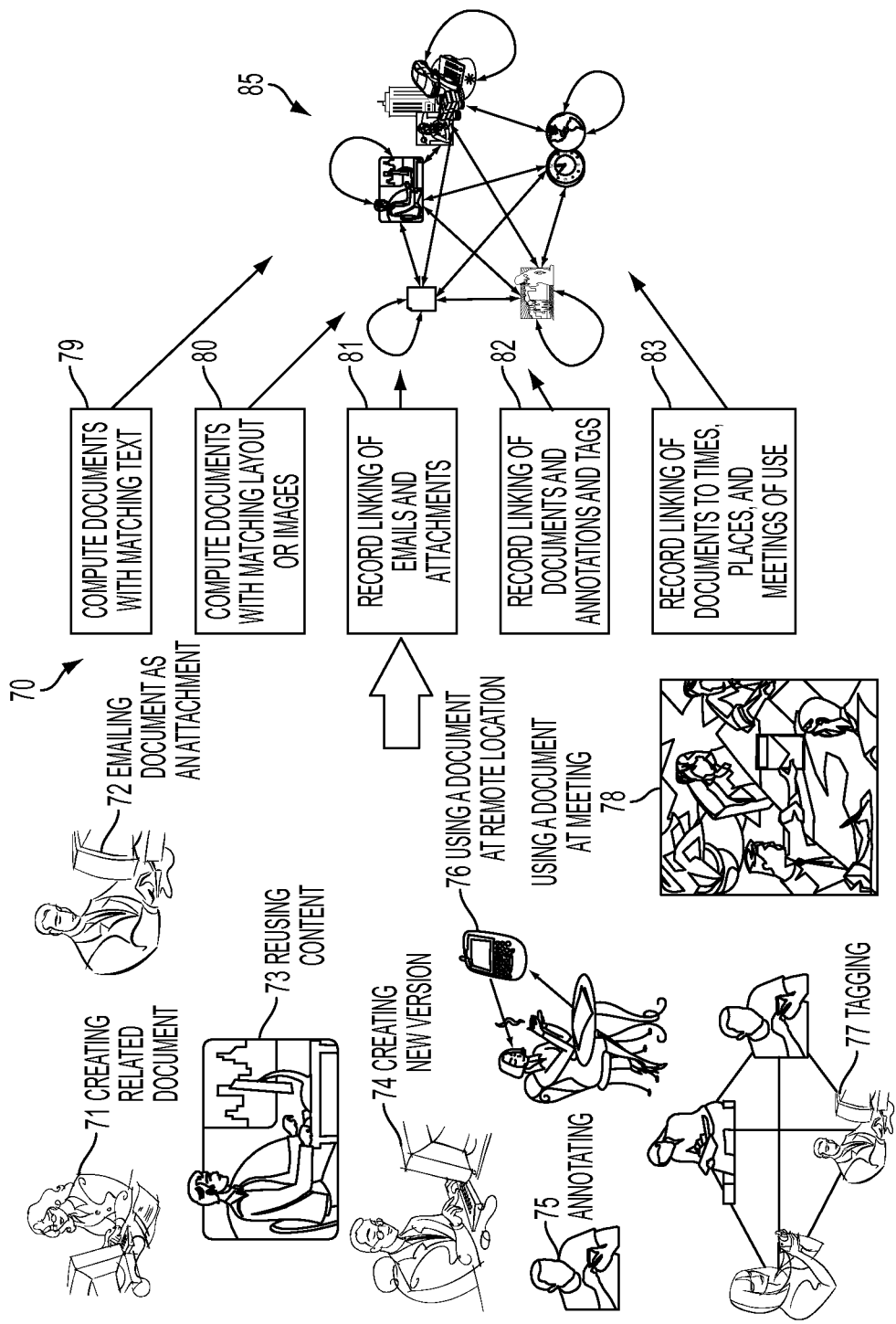
FIG. 6 is a block diagram showing, by way of example, context analysis from human activity on a document using the content analysis engine of FIG. 3.

Generally speaking, documents are created and modified through individual and collaborative human effort. FIG. 6 is a block diagram showing, by way of example, context analysis 70 from human activity on a document using the content analysis engine of FIG. 3. A range of activities may occur during the life cycle of a document, which include creating a related document 71 from another source document; emailing or electronically transmitting 72 a document as, for instance, an attachment to a message; reusing content 73 from another source document in a new document; creating a new version 74 of an existing document; annotating or electronically marking up 75 a document; using a document at a remote location 76, such as when accessing a centralized document repository over an internetwork; tagging or electronically marking 77 a document; or using a document at a meeting 78. Other human activities could also be performed upon or with a document. Based upon the human activities 71-78, context analysis can be performed by the context analysis engine in each collector 32*a-b*, for instance, computing documents with matching text 79; computing documents with matching layout or images 80; recording linking of emails and attachments 81; recording linking of documents, annotations, and tags 82; and recording linking of documents to times, places, and meetings of use 83. Other types of context analysis are possible. The culmination of the context analysis 79-84 on the human activities 71-78 are embodied in a context network 85 stored in a context repository 33*a-b*, which represents the computed linkages as edges in the context network 85, with weights added to the edges to indicate stronger or weaker relationships. Other forms or representations of context network-type information are possible.

Figure 7:
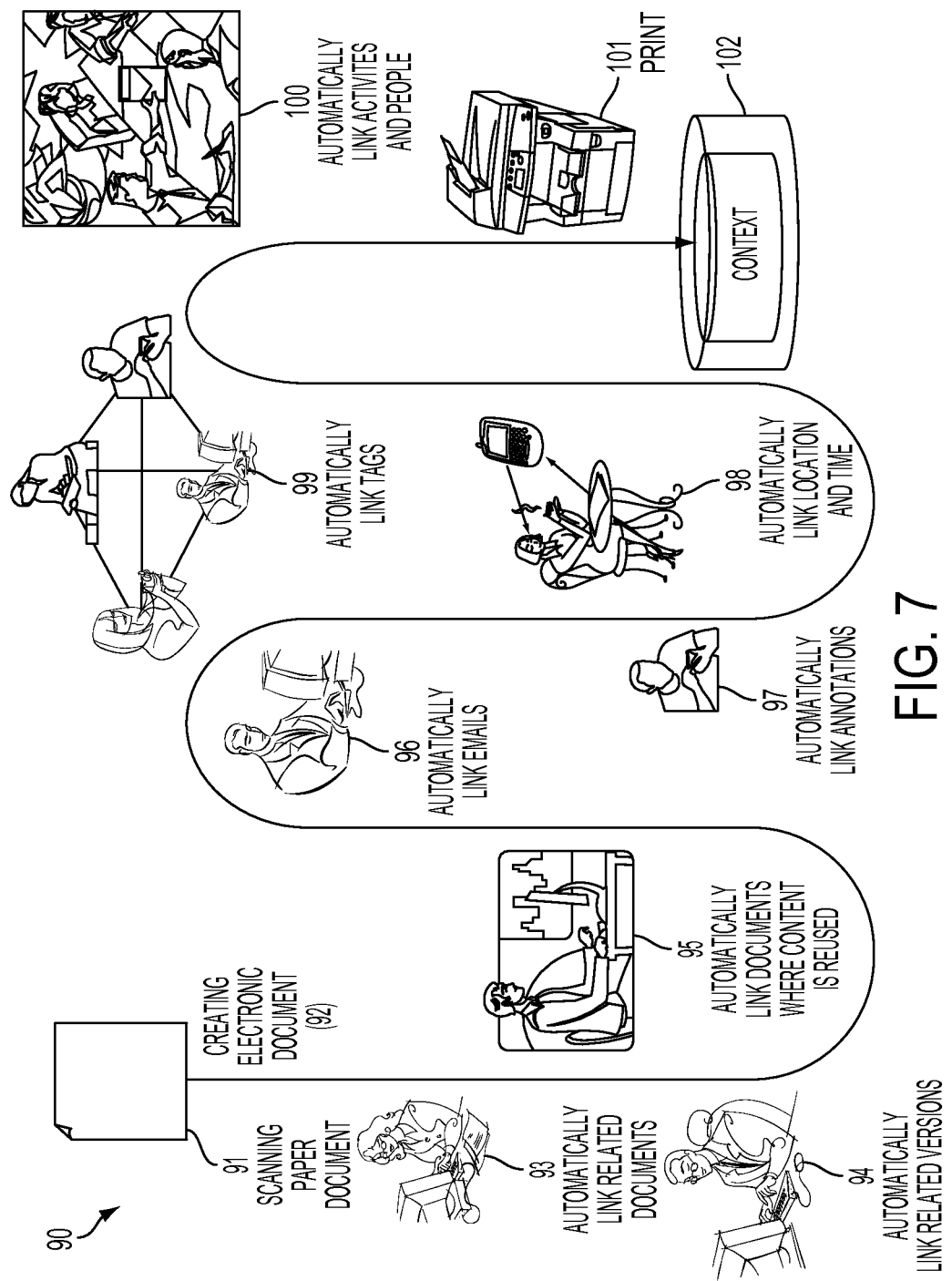
FIG. 7 is a block diagram showing, by way of example, human activity throughout the life of a document as a source of context with the enterprise environment of FIG. 1.

Human activities on documents usually occur in a pattern that is unique for each document, depending upon who, what, where, when, and how the document affects or applies to different parties. FIG. 7 is a block diagram showing, by way of example, human activity 90 throughout the life of a document as a source of context within the enterprise environment 10 of FIG. 1. As a starting point, a document can originate 91 in traditional printed form and scanned or converted into an electronic representation using optical character recognition or similar technologies, be electronically created 92, or through a combination of traditional and electronic means. The document may be automatically or manually linked to related documents 93, such as via hyperlinks. Similarly, the document may be automatically or manually linked to related versions 94 of the document, or to documents where content is reused 95. Conversely, emails 96, annotations 97, time and location 98, tags, 99, or activities and people 100 can be automatically or manually linked to the document. The document can be printed 101. The resulting linked structures and other context are ultimately stored as context 102 in a context repository 33*a-b*.

Document Processing Flow

Figure 8:
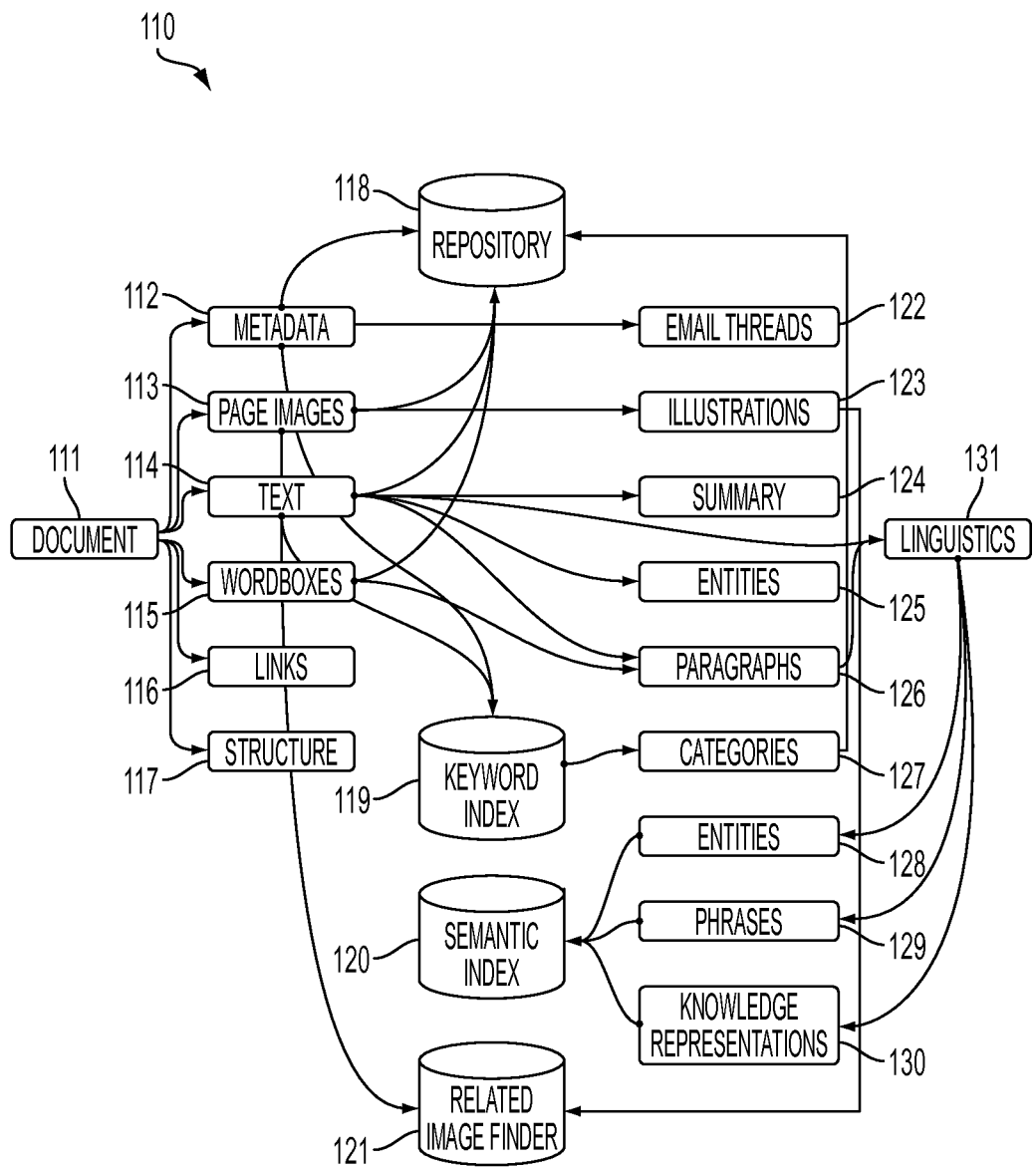
FIG. 8 is a data flow diagram showing document processing through the content analysis engine of FIG. 3.

Documents and human activities performed on them provide sources of context. FIG. 8 is a data flow diagram showing document processing 60 through the content analysis engine of FIG. 3. In terms of document content, the content analysis engine analyzes each document 111 to extract or compute metadata 112, page images 113, text 114, word boxes 115 (rectangles that describe the width, height and position of each word on each page), links 116, and overall structure 117. Additional modules (not shown) are used to analyze the human use context of documents. The extracted metadata 112 is stored in a repository 118, or graph database, for use by applications and is also evaluated for email threads 122, which can be detected from elements of the metadata 112, such as the sender and recipients of each email, the subject field of the email, and other elements. The page images 113 are stored into the repository 118 and also evaluated for illustrations 123 that are separately stored into a related image finder index 121. Text 114 is stored into a keyword index of full text and metadata 119 and is also evaluated for any summaries 124, entities 125, and paragraphs 126. Text 114 and paragraphs 126 are also processed by linguistic analysis 131, which generates entities 128, phrases 129, and knowledge representations 130 that are stored into a semantic index 120. Word boxes 115 are used as layout information to determine the beginning and ending points of document paragraphs 126 and are stored in the key word index of full text and metadata 119, so that matches in the full text index will allow the system to find the geometric location of matched words and phrases in the generated page images.

Sidebar Examples

Conventional productivity applications use visually-separate windows, such as pop-up dialog or adjacently-appearing sidebar windows to display extended information, but at the risk of creating eye and cursor distractions. In the embodiments described herein, the sidebar, also referred to as a "context bar," is used to provide context to a user regarding the immediate state of a current task being performed through a productivity application on a document or other written exchange currently in use, such as an email, spreadsheet, presentation, or Web page.

Figure 9:
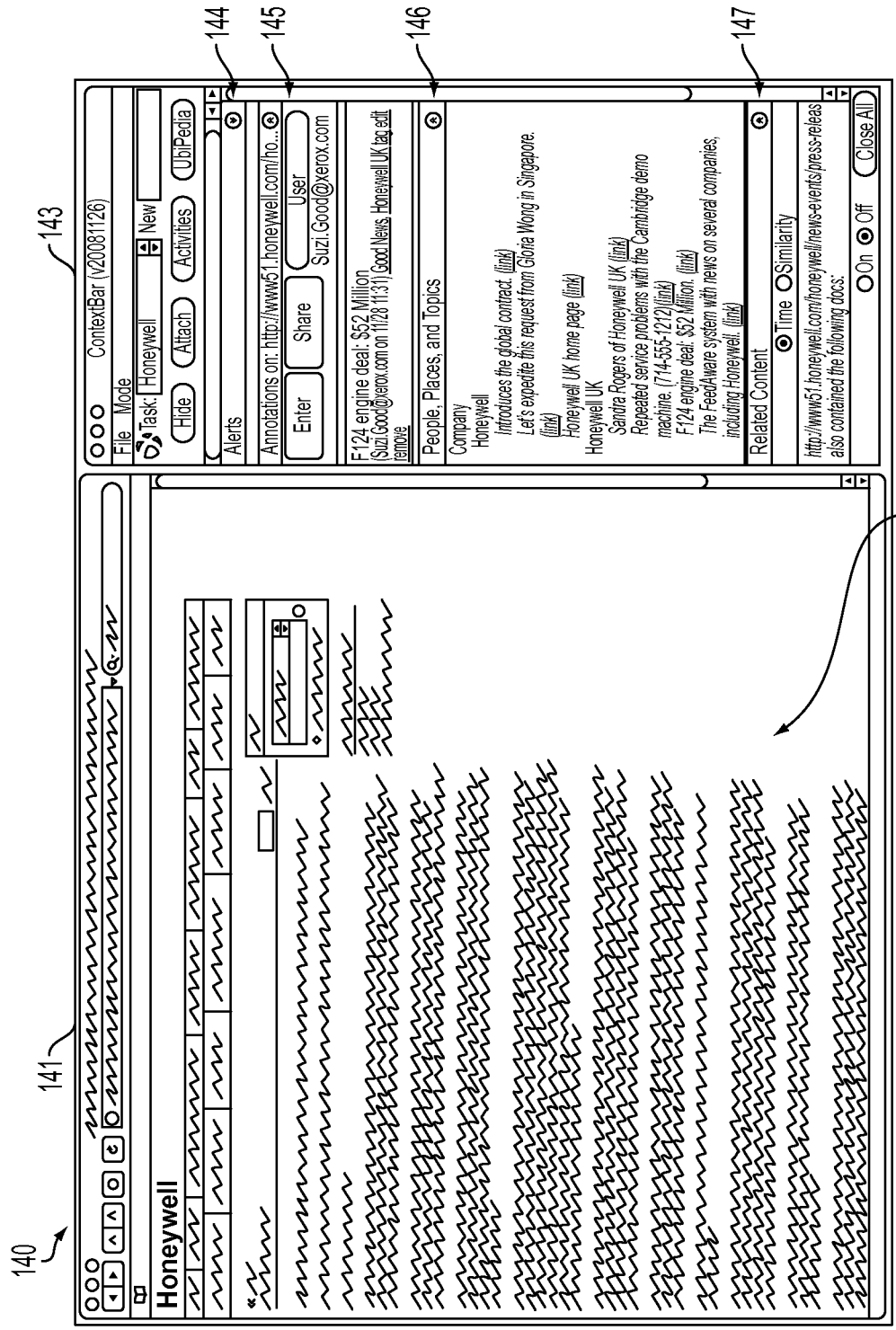
FIG. 9 is a diagram showing, by way of example, a context-sensitive sidebar appearing directly to the right of an application window.

The context-sensitive sidebar moves automatically and is adaptively positioned directly alongside the currently active application window. FIG. 9 is a diagram showing, by way of example, a context-sensitive sidebar appearing directly to the right of an application window 141, which can be, for instance, a Web browser, document reader, document editor, email reader, document folder browser, or other application.

The placement of the sidebar 143 is intended to minimize eye and cursor travel, but can be on either side of, or above or below, the application window 141, as screen space 140 permits. The context is dynamically extracted and is directly relevant to the document currently in use. As well, the sidebar 143 is adapted to make optimal use of the screen space available based on the quantity of contextual information available and the perceived user needs.

The context presented in the sidebar 143 is coupled to the document 142 displayed in the active window. The sidebar 143, as a presenter 33 (shown in FIG. 3), retrieves the context from the context repository 31. As described supra, the context is determined in advance or on-the-fly by a context analysis engine which operates as part of kernels 23a-b (shown in FIG. 2) provided with each computing system. The sidebar 143 can, for instance, discover the file name or Uniform Resource Locator (URL) of the document 142 and may also extract the contents of that document 142.

The sidebar 143 can provide access to the context through several tools. For example, an alert tool 144 can be set to trigger the displaying of a message or other action upon encountering specific content within the document 142, such as triggering the display of proposal-writing guidelines when the current document is an email that requests a proposal. An annotation tool 145 to display comments on document 142 made in the past by this user or another user, or to add new comments to document 142. A People, Places, and Topics tool 146 dynamically identifies people, organizations, places, localities, and topics discovered by the content analysis engine in the document 142 and displays information about related documents, people, places, or topics as found in the context repository. Finally, a related content tool 147 finds documents that have significant content in common with document 142, such as similar or identical paragraphs, similar or identical images, or similar or identical pages. This related content tool 147 can use document fingerprinting, paragraph fingerprinting, and image fingerprinting to discover if any content in the document has been viewed or stored previously, either by the current user or other users in the enterprise, after which the related content tool 147 can retrieve and display information that pertains to the matching content. Fingerprints can be computed, for example, by taking the hash of the entire document file, or a hash of a part of the document, such as the text of a paragraph. Other fingerprinting techniques are possible.

In basic form, the sidebar 143 addresses the problems of excessive eye and cursor travel by placing the sidebar 143 closer to the active window and by moving the sidebar, so that the sidebar remains close to the active window when the active window moves, as well as addressing the problem of too much irrelevant information by coupling displayed information directly to the currently active document.

Figure 10:
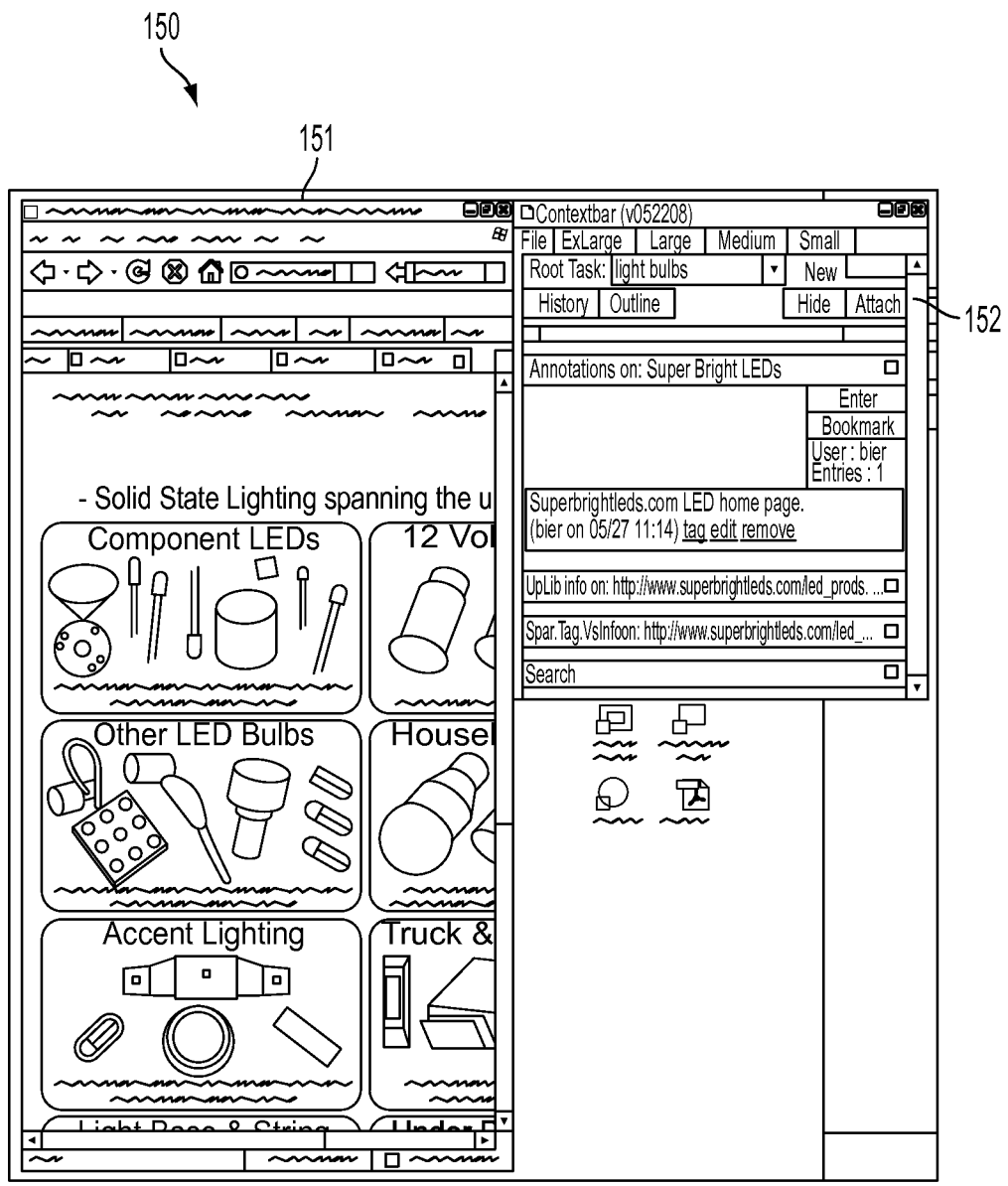
FIG. 10 is a diagram showing, by way of example, a context-sensitive sidebar adaptive to screen space within an application window.

In a further embodiment, the sidebar 143 can be enhanced for improved dynamic adaptation. For example, the sidebar 143 addresses the problem of excessive use of screen space by adapting its size, transparency and other properties based on the size and importance of the information to be displayed. The enhancements non-exclusively include:

1) Adaptive Screen Space: The total area of the sidebar can be automatically adjusted based on the amount of content to be displayed. FIG. 10 is a diagram showing, by way of example, a context-sensitive sidebar 152 adaptive to screen space 150 within an application window 151. For example, if no context is available to be displayed for the current document, the sidebar 152 may adopt a minimal height or width relative to the active window 151. Likewise, if only a small amount of context is available to be displayed, the sidebar 152 may adopt just the minimal height or width necessary to make that context available and to display any input regions that are to be available to the user. Adaptive screen space may be combined with semantic zooming, so that the kind of information displayed is determined by the amount of screen space available. For example, when space is tight, annotations may be summarized, documents may be represented by small thumbnails or partial file names, names of people may be abbreviated with initials, and so on. Furthermore, when the sidebar has no useful information to display, the sidebar 152 could appear as a context star icon, as further described infra.

2) Semi-Transparency (not shown): Elements of the sidebar, such as one of the tools 144-147, that need to be displayed, but need not be salient, can be displayed in a semi-transparent fashion, so that the user can see and read windows underneath the sidebar. For example, the text input area of the annotation tool 145, can be rendered to appear semi-transparently when the text input area contains no text and the user is not interacting with the annotation tool 145.

3) Toolbar Presentation (not shown): A "toolbar presentation" of the sidebar 143 can be provided when the user wants to have some awareness of context, but does not wish the sidebar 143 to take up screen space outside of the boundaries of the active window 142. In toolbar presentation mode, the sidebar 143 presents an information summary within the confines of the active window 142. For example, a small amount of space within the status bar of a Web browser window could be used to tell the user how many annotations are available for the current document, or to notify the user via an icon or text string that new versions of the current document exist. The toolbar presentation mode can also be clickable, where a user click will expand the sidebar 143 to full size mode.

4) Animated Transitions (not shown): Animated transitions can be used for the appearance and disappearance of the sidebar 143, such as fading in and fading out, or sliding in and sliding out, respectively, so the sidebar 143 draws less attention upon appearing or disappearing from view.

5) Coordinated Window Management (not shown): To reduce the burden of managing the sidebar 143, the sidebar 143 can travel, when possible, with the active window 142, so that managing the active window 142 also manages the sidebar 143. For example, given an active window A and a sidebar C, sidebar C will open whenever window A opens; move to window A when window A becomes the active window, such as by fading out at its current location and fading in at the location of window A; close when window A closes, provided window A was the last active window; move when window A moves; and shrink in height when window A shrinks in height, if is not already smaller than the new height of window A. Window A could also be resized by dragging the edge or corner of sidebar C, particularly if a different mechanism is available to resize sidebar C.

Figure 11:
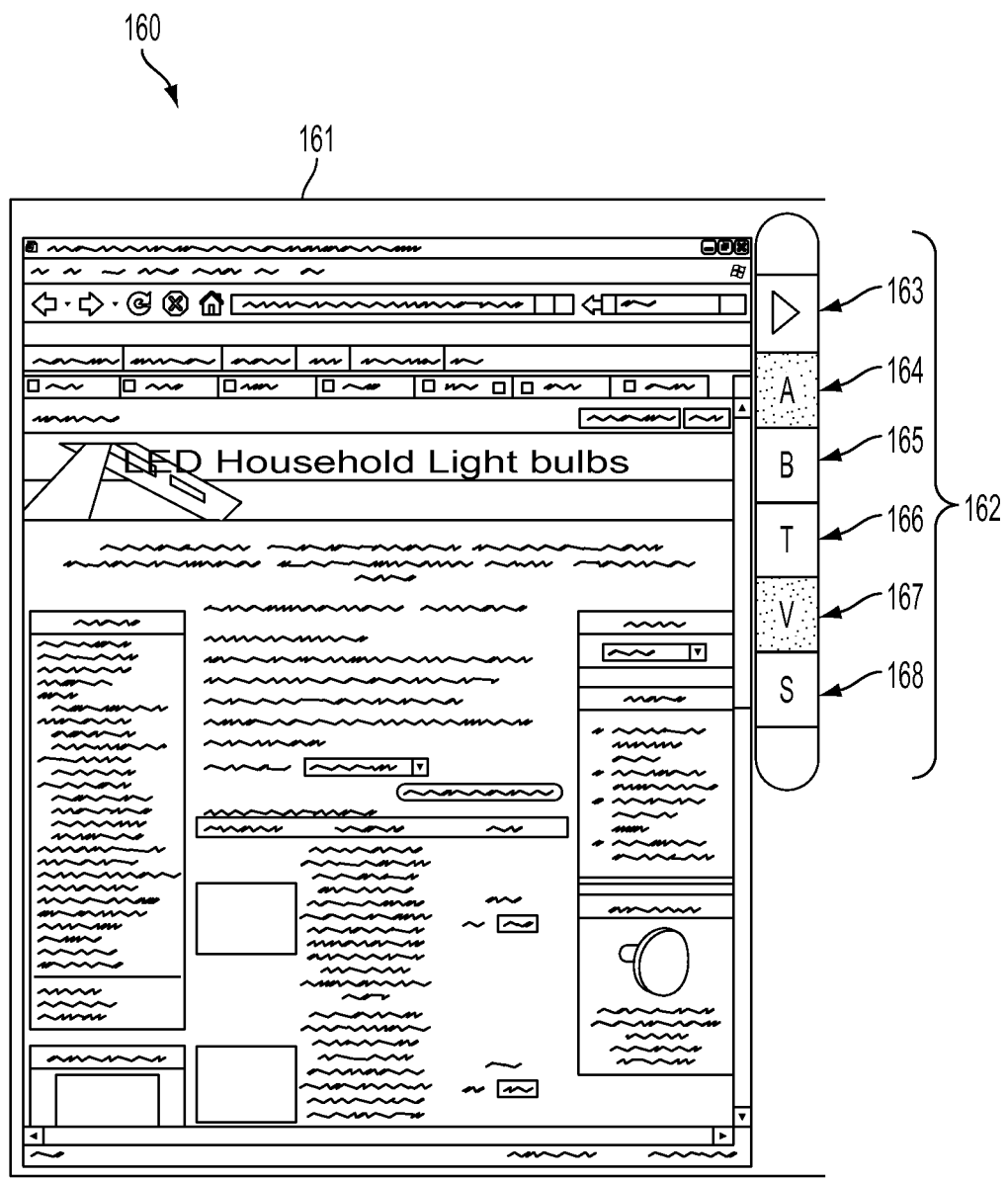
FIG. 11 is a diagram showing, by way of example, a context-sensitive sidebar presented in a "minibar" mode.

6) Minibar: Situations may arise where full context is not needed, but more context is needed than can be displayed in toolbar presentation mode. FIG. 11 is a diagram showing, by way of example, a context-sensitive sidebar 162 presented in a "minibar" mode 160 next to an application window 161, such as through a narrow strip 162 with context communicated compactly using color, icons, and short text strings. Likewise, in minibar mode, the user will be able to use compact interactors, that is, logical arrows and labeled buttons, to initiate operations, such as annotation, tagging, bookmarking, and so on. To transition from minibar mode to full mode, the user can select a right arrow button 163 on the minibar 162 that causes the full-width sidebar to appear in place of the minibar and animate smoothly to its full width. A left arrow button on the full sidebar (not shown) collapses the sidebar back into a minibar 162.

For example, each tool in the full-sized sidebar may be assigned a small rectangle 164-168. For instance, an "annotations" section 164, shown as a rectangle containing the letter 'A,' puts up a dialog box allowing the user to view or add annotations. A "bookmarks" section 165, shown as a rectangle containing the letter 'B,' allows the user to bookmark the current document without expanding the sidebar. A "topics" section 166, shown as a rectangle containing the letter 'T,' may turn red if topics have been identified for the document. Similarly, a "versions" section 167, shown as a rectangle containing the letter 'V,' may turn red if a newer version exists or if documents with significant overlap in content have been found. Finally, a "search" section 168, shown as a rectangle containing the letter 'S,' may be clicked to bring up a search dialog box to help the user find related content. For the topics or versions, a pop-up tool tip can display a string (not shown), such as "topics for this document exist," "newer versions of this document exist," or "similar content for this document exist," respectively. Other compact interactors are possible.

Figure 12:
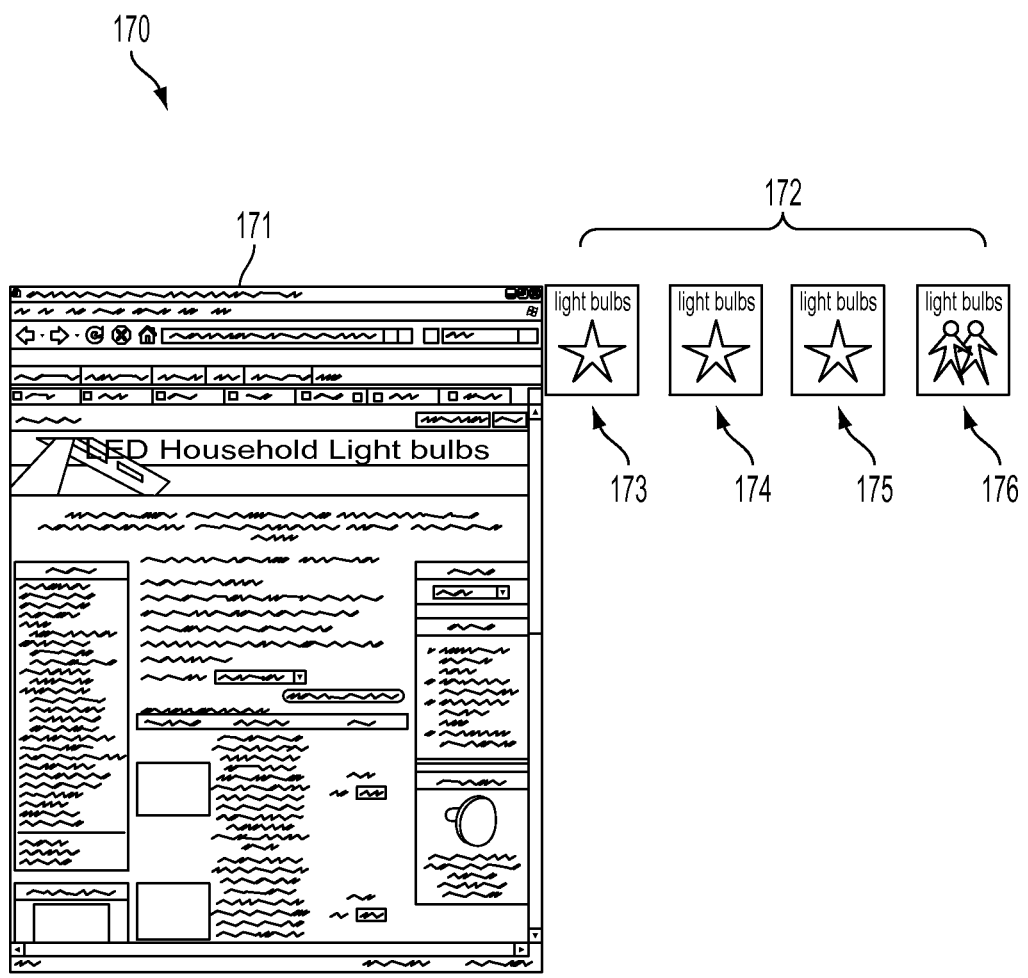
FIG. 12 is a diagram showing, by way of example, a compact mode sidebar next to an application window.

7) Context Star: A more compact mode of the sidebar, referred to as a "context star" sidebar, is possible that displays a single compact tool. FIG. 12 is a diagram showing, by way of example, a compact mode sidebar 172 next to an application window 171. For purpose of discussion, the various appearances 173-176 of the context star 172 are shown appearing at the same time at different left to right positions, but, during operation, the context star 172 appears in just one place with an appearance 173-176 that changes at different times. The appearances 173-176 include: New 173 (indicating that the active document has not been bookmarked, tagged, annotated, and so forth), Interesting 174 (indicating that the active document has been bookmarked, tagged or annotated, but only for personal use, and not yet fully processed), Active 175 (indicating that the active document has been bookmarked, tagged or annotated, and fully processed, but only for personal use), Shared 176 (indicating that the document is interesting and will be made available to others), or Active Shared (not shown) (Active and Shared). Still further context star appearances are possible. Clicking on the context star button causes interactors to appear that achieve the operations of bookmarking, tagging, annotating, navigating to bookmarked documents, navigating to other versions, and so on.

8) Multiple Sidebars (not shown): At times when the user is frequently switching between two or more windows and making each the active window in turn, the sidebar described so far will be constantly repositioning itself to be next to the currently active window. This repositioning behavior can create a distracting impression that the sidebar is "bouncing around" on the electronic desktop. To counteract the problem of bouncing sidebars, more than one sidebar is displayed simultaneously and positioned next to the most recently active windows. If the user is bouncing back and forth between two or more windows, the sidebar display remains stable during the interaction. Multiple sidebars require more total screen space than a single sidebar and can be combined with a "context star" sidebar or other technique to reduce the total screen space used by each sidebar.

Figure 13:
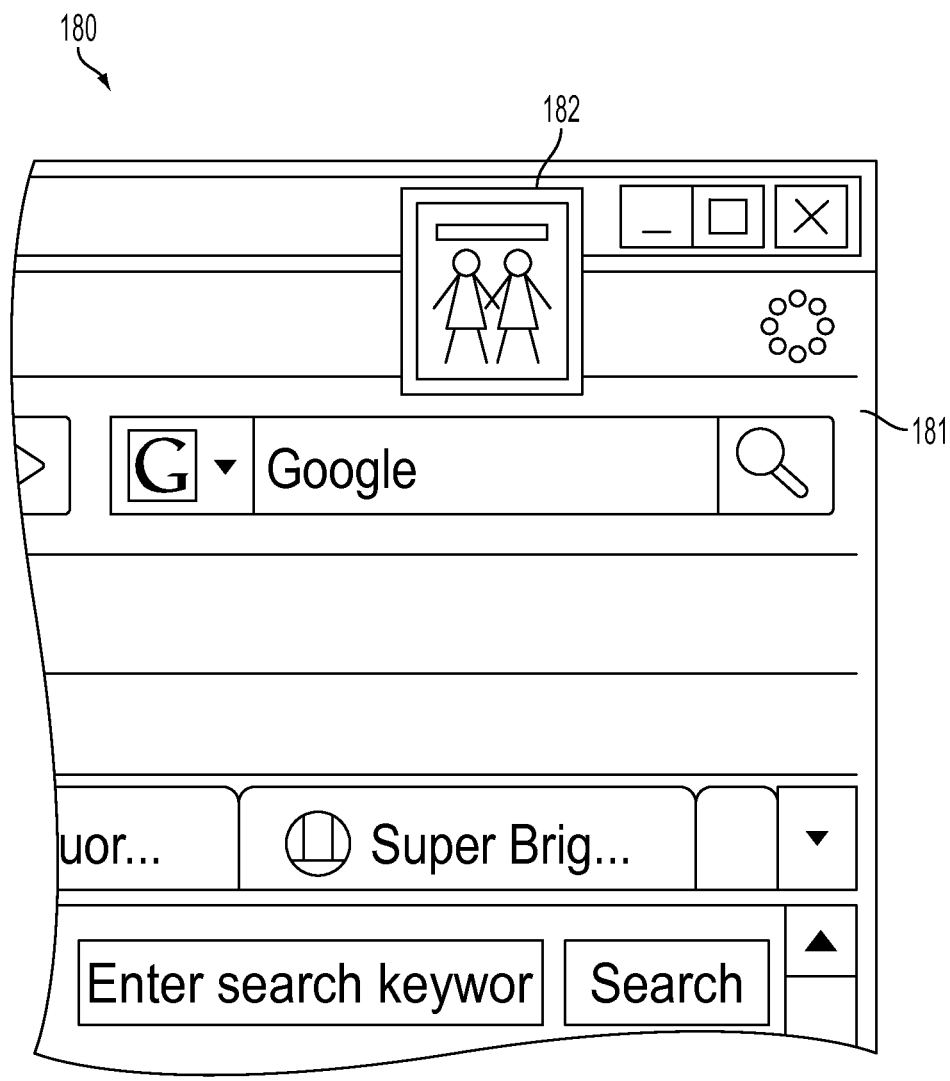
FIG. 13 is a diagram showing, by way of example, a space-saving sidebar within an application window.

9) Tucking: To further save screen space and simplify window management, the sidebar can be positioned on top of an associated document window. FIG. 13 is a diagram showing, by way of example, a space-saving sidebar 182 within an application window 181. The positioning takes into account the placement of important information and interaction targets on the document window, so that the sidebar does not obscure important information nor prevent use of the interactors. Detection of the position of high-value information in the underlying window 181 may be done either by inspecting the structure of the underlying window as a hierarchy of user interface components 180, or less intrusively by performing image processing operations on the window image to detect regions of low information content.

Figure 14:
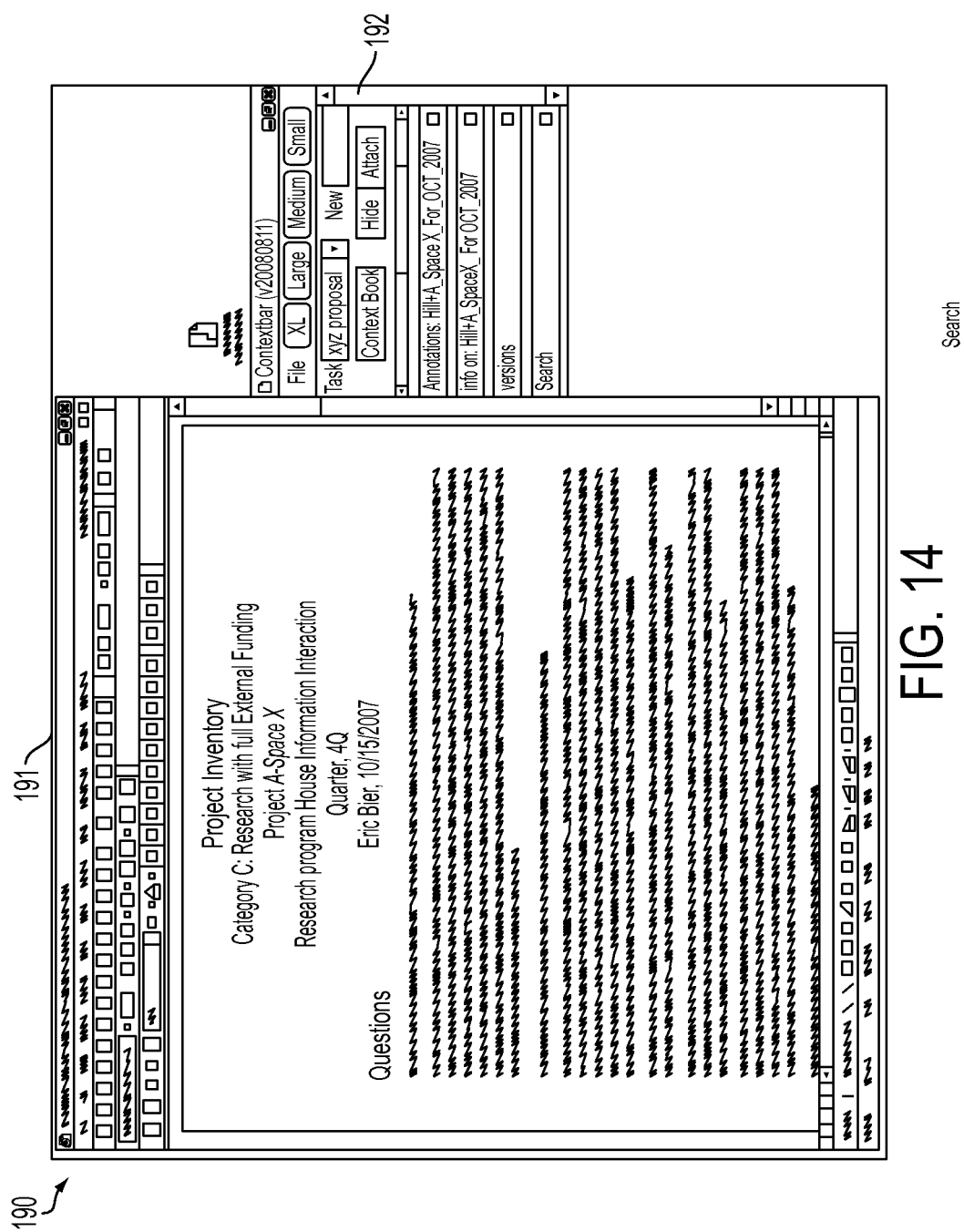
FIG. 14 is a diagram showing, by way of example, a context-sensitive sidebar with adaptive window edge placement within an application window.

10) Adaptive Window Edge Placement: When the sidebar is displayed outside of the application window to which the sidebar is attached, the placement of the sidebar can be adjusted to be minimally disruptive to a user's work. FIG. 14 is a diagram showing, by way of example, a context-sensitive sidebar 192 with adaptive window edge placement 190 within an application window 191. To adapt window edge placement, the location and relative importance of each icon or other object on the electronic desktop is first determined and importance values are assigned to each pixel. Either or both of vertical and horizontal positioning of the sidebar is adjusted by evaluating the importance values with the number and value of pixels obscured by the sidebar minimized and adjacency of the sidebar to the application window maintained. For example, the sidebar 192 can appear to the right of a text editor window, but not be positioned flush with the top nor the bottom of the window. For instance, the sidebar 192 can be positioned below the top of the window to allow the user to see and interact with a "Shortcut" icon that is visible on the desktop. Adaptive window edge placement can be used to find a position that blocks as few targets, particularly high value targets, as possible, which include the Microsoft Windows Start button, objects on the Windows task bar, window corners, buttons that minimize, maximize, and close windows, desktop icons, tool tray icons and so on. While the invention has been particularly shown and described as referenced to the embodiments thereof, those skilled in the art will understand that the foregoing and other changes in form and detail may be made therein without departing from the spirit and scope.

What is claimed is:

1. A computer-implemented system for managing a context-sensitive sidebar window, comprising:
   contextual information relevant to an electronic document displayed on an electronic desktop;
   a presentation module to present a portion of the contextual information in a sidebar window;
   a window management module to manage a display of the context-sensitive sidebar window within the electronic desktop adjacent to the electronic document by determining a location of one or more icons on the electronic desktop, assigning an importance value to each of the one or more icons, assigning an importance value to each pixel of the icons in the electronic desktop, adjusting at least one of a vertical and horizontal positioning of the context-sensitive sidebar within the electronic desktop based on the importance of the icons and the importance of the icon pixels within the electronic desktop such that coverage of the pixels of the icons, associated with a higher importance, by the context-sensitive sidebar is minimized, automatically opening the context-sensitive sidebar window when the electronic document is opened, and automatically closing the context-sensitive sidebar window when the document is closed; and
   a processor to execute the modules.

2. A system according to claim 1, further comprising at least one of:

a window adjustment module to determine a total area of the context-sensitive sidebar window based on an amount of the contextual information to be displayed and to automatically adjust the area of the sidebar.

3. A system according to claim 1, further comprising:

a presentation module to present at least a portion of the context-sensitive sidebar window as semi-transparent.

4. A system according to claim 1, further comprising:

a presentation module to present the context-sensitive sidebar window as a toolbar.

5. A system according to claim 1, further comprising:

a transition module to apply animated transitions to the context-sensitive sidebar window comprising one or more of fading in, fading out, sliding in, and sliding out of view on a display.

6. A system according to claim 1, wherein the management module further manages the context-sensitive sidebar window based on an active window for the electronic document by at least one of moving the context-sensitive sidebar window with the active window, shrinking the context-sensitive sidebar window with the active window, and resizing the active window based on a size of the context-sensitive sidebar window.

7. A system according to claim 1, further comprising:

a presentation module to present the context-sensitive sidebar window as a minibar comprising compact indicators for at least one of an annotations section, a bookmark section, a topics section, a versions section, and a search section.

8. A system according to claim 1, further comprising:

a presentation module to determine regions of low information content in the electronic document and to position the context-sensitive sidebar window on top of the low information region of the electronic document.

9. A system according to claim 1, further comprising:

a presentation module to position the context-sensitive sidebar on the electronic desktop such that a minimal number of the objects icons on the electronic desktop are blocked.

10. A system according to claim 1, wherein the context-sensitive sidebar window presents at least one of annotations of the electronic document, topics of the electronic document, and notice of a newer version of the electronic document.

11. A computer-implemented method for managing a context-sensitive sidebar window, comprising:

determining contextual information relevant to an electronic document displayed on an electronic desktop;

presenting a portion of the determined contextual information in a sidebar window; and managing a display of the context-sensitive sidebar window within the electronic desktop adjacent to the electronic document, comprising:

determining a location of one or more icons on the electronic desktop and assigning a relative importance to each of the one or more icons;

assigning an importance value to each pixel of the icons in the electronic desktop;

adjusting at least one of a vertical and horizontal positioning of the context-sensitive sidebar within the electronic desktop based on the importance of the icons and the importance of the icon pixels within the electronic desktop such that coverage of the pixels of the icons, associated with a higher importance, by the context-sensitive sidebar is minimized;

automatically opening the context-sensitive sidebar window when the electronic document is opened; and automatically closing the context-sensitive sidebar window when the document is closed.

12. A method according to claim 11, further comprising at least one of:

determining a total area of the context-sensitive sidebar window based on an amount of the contextual information to be displayed; and automatically adjusting the area of the sidebar.

13. A method according to claim 11, further comprising:

displaying at least a portion of the context-sensitive sidebar window as semi-transparent.

14. A method according to claim 11, further comprising:

presenting the context-sensitive sidebar window as a toolbar.

15. A method according to claim 11, further comprising:

applying animated transitions to the context-sensitive sidebar window comprising one or more of fading in, fading out, sliding in, and sliding out of view on a display.

16. A method according to claim 11, further comprising:

managing the context-sensitive sidebar window based on an active window for the electronic document, comprising at least one of:

moving the context-sensitive sidebar window with the active window;

shrinking the context-sensitive sidebar window with the active window; and resizing the active window based on a size of the context-sensitive sidebar window.

17. A method according to claim 11, further comprising:

presenting the context-sensitive sidebar window as a minibar comprising compact indicators for at least one of an annotations section, a bookmark section, a topics section, a versions section, and a search section.

18. A method according to claim 11, further comprising:

determining regions of low information content in the electronic document; and positioning the context-sensitive sidebar window on top of the low information region of the electronic document.

19. A method according to claim 11, further comprising:

positioning the context-sensitive sidebar on the electronic desktop such that a minimal number of the icons on the electronic desktop are blocked.

20. A method according to claim 11, wherein the context-sensitive sidebar window presents at least one of annotations of the electronic document, topics of the electronic document, and notice of a newer version of the electronic document.

* * * * *